United States Patent Office 3,312,706
Patented Apr. 4, 1967

3,312,706
PHOSPHORAMIDOTHIOATES
Raymond H. Rigterink, Midland, Mich., assignor to The Dow Chemical Company, Midland, Mich., a corporation of Delaware
No Drawing. Filed Feb. 14, 1963, Ser. No. 258,617
5 Claims. (Cl. 260—281)

This application is a continuation-in-part of my former application, Ser. No. 81,253, filed Jan. 9, 1961, now abandoned.

This invention is directed to phosphorus derivatives and is more particularly directed to naphthalimido phosphoramidothioates corresponding to the formula

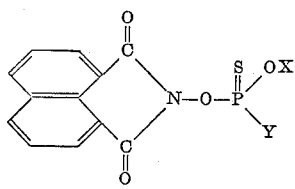

In this and succeeding formulae, X represents loweralkyl and Y represents amino or loweralkylamino.

In the present specification and claims, the expression "loweralkyl" is employed to refer to the alkyl radicals containing from 1 to 4 carbon atoms inclusive.

These novel compounds are liquid or crystalline solid materials which are somewhat soluble in many common organic solvents and of very low solubility in water. The compounds are useful as parasiticides and are adapted to be employed as active toxic constituents of compositions for the control of mite, insect, helminth, bacterial and fungal organisms such as mites, ticks, aphids, beetles, flies, worms, *Haemonchus contortus, Ostertagia ostertagi,* Bunostromum sp. and *Fusarium oxysporum lycopersici.* The compounds are also residual and give excellent controls over a prolonged period.

The compounds of the present invention can be prepared by several methods. In one procedure the compounds are prepared by reacting an O-loweralkyl phosphoramidochloridothioate corresponding to the formula

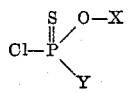

with N-hydroxynaphthalimide, corresponding to the formula

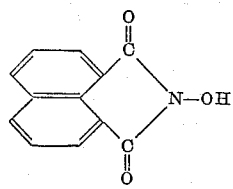

The reaction between the N-hydroxynaphthalimide and the phosphoramidochloridothioate is carried out in the presence of an acid binding agent such as an alkali metal hydroxide, alkali metal carbonate or tertiary amine, and conveniently in an inert organic liquid such as acetone, benzene, carbon tetrachloride, chloroform, toluene, methylene dichloride and dimethyl foramide. Also, the reaction can be carried out in the presence of water as reaction medium. The amounts of the reagents to be employed are not critical, some of the desired product being obtained when employing any proportion of the materials. In the preferred method of operation, good results are obtained when employing substantially equimolecular proportions of the acid binding agent, N-hydroxynaphthalimide and phosphoramidochloridothioate. The reaction takes place smoothly at the temperature range of from 20° to 100° C. with the production of the desired product and chloride of reaction. This chloride appears in the reaction mixture as the chloride salt of the cation of alkali metal binding agent, or the hydrogen chloride salt of the amine binding agent such as pyridine hydrochloride.

In carrying out the reaction, the reactants are mixed and contacted together in any convenient fashion, and the resulting mixture maintained for a period of time in the reaction temperature range to complete the reaction. Following the completion of the reaction, the reaction mixture can be washed with water and any organic reaction medium removed by fractional distillation under reduced pressure to obtain the desired product as a residue. This product is further purified by conventional procedures such as washing with water and dilute aqueous alkali metal hydroxide, and extraction with various organic solvents.

In an alternative procedure, the new compounds are prepared by reacting an O-loweralkyl phosphorodichloridothioate having the formula

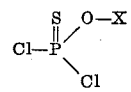

with the N-hydroxynaphthalimide compound to form an intermediate phosphorochloridothioate as a monochloride having the structure

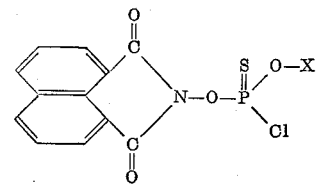

This intermediate is thereafter reacted with ammonia or with a loweralkylamine to produce the desired product. The reaction between the N-hydroxynaphthalimide compound and O-loweralkyl phosphorodichloridothioate is carried out in the presence of an acid binding agent and preferably in an inert organic liquid as reaction medium. Good results are obtained when employing substantially equimolecular proportions of the acid binding agent, N-hydroxynaphthalimide compound, and phosphorodichloridothioate. The conditions of reaction to be employed in the preparation of the mono-chloride intermediate are all as previously described.

The reaction between the mono-chloride intermediate and ammonia or loweralkylamine is somewhat exothermic and takes place at the temperature range of from −10° C. to 30° C. The temperature is controlled by regulating the rate of mixing and contacting the reactants together and by external cooling. The desired product is obtained when employing any proportion of the reagents. In a preferred procedure, one molecular proportion of the mono-chloride intermediate is employed with at least two molecular proportions of ammonia or the loweralkylamine reagent. Hydrogen chloride is a by-product in the reaction and is removed as the hydrochloride salt of the amine or ammonia reactants. Upon completion of the reactions, the reaction mixture can be processed in accordance with conventional procedures as previously described to obtain the desired product as a residue.

The following examples merely illustrate the invention and are not to be construed as limiting.

*Example 1.—O-naphthalimido O-methyl N-methyl phosphoramidothioate*

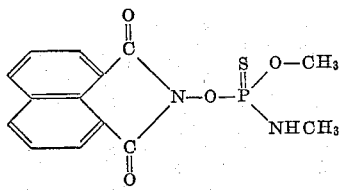

O - methyl N - methyl phosphoramidochloridothioate (16 grams; 0.1 mole) was added rapidly with stirring at room temperature to a mixture consisting of 21.3 grams (0.1 mole) of N-hydroxynaphthalimide, 13.8 grams (0.1 mole) of potassium carbonate, 50 milliliters of dimethyl formamide and 200 milliliters of acetone. The addition was carried out with stirring and at a temperature of from 24° to 27° C. Stirring was continued at room temperature for 1½ hours and then at a temperature of from 60° to 65° C. for 2 hours to complete the reaction. The reaction mixture was thereafter filtered and the filtrate diluted with an equal volume of water and the resulting aqueous mixture cooled in an ice bath. During the cooling the O-naphthalimido O-methyl N-methyl phosphoramidothioate product precipitated in the mixture as a crystalline solid. This product was separated by filtration and recrystallized from ethanol. The recrystallized product melted at 184°–185° C. and had a sulfur content of 9.94 percent as compared to a theoretical content of 9.53 percent.

*Example 2.—O-naphthalimido O-methyl N-tert-butyl phosphoramidothioate*

A mixture consisting of 21.3 grams (0.1 mole) of N-hydroxynaphthalimide, aqueous 50 percent sodium hydroxide (equivalent to 0.1 mole) and 800 milliliters of water was heated at the boiling temperature for about 25 minutes and thereafter diluted with 16.5 grams (0.1 mole) of O-methyl phosphorodichloridothioate. The dilution was carried out with stirring and at a temperature of from 28° to 31° C. Stirring was thereafter continued at room temperature for 10 minutes and 29.2 grams (0.4 mole) of tertiarybutyl amine added portionwise to this mixture containing the O-naphthalimido O-methyl phosphorochloridothioate intermediate. The addition was carried out over a period of 10 minutes and at a temperature of from 28°–31° C. Stirring was continued for one hour and the reaction mixture thereafter filtered to obtain the O-naphthalimido O-methyl N-tert-butyl phosphoramidothioate product as a crystalline solid. This product was recrystallized from a petroleum ether boiling at 86° to 100° C. and the recrystallized product found to melt at 152° to 153° C.

In exactly similar procedures other compounds of the present invention are prepared of which the following are representative:

O-naphthalimido O-methyl N-ethyl phosphoramidothioate melting at 175°–176° C.

O-naphthalimido O-methyl N-propyl phosphoramidothioate melting at 120°–122° C.

O-naphthalimido O-methyl N-isopropyl phosphoramidothioate melting at 151°–153° C.

O-naphthalimido O-methyl N-sec-butyl phosphoramidothioate melting at 113°–116° C.

O-naphthalimido O-methyl N-isobutyl phosphoramidothioate melting at 140°–143° C.

O-naphthalimido O-ethyl N-ethyl phosphoramidothioate melting at 173°–174° C.

O-naphthalimido O-propyl N-propyl phosphoramidothioate melting at 141.5°–143° C.

O-naphthalimido O-isopropyl phosphoramidothioate melting at 162°–164° C.

O-naphthalimido O-butyl N,N-dimethyl phosphoramidothioate (molecular weight of 392.4).

O-naphthalimido O-butyl N-butyl phosphoramidothioate melting at 108°–111° C.

O-naphthalimido O-sec-butyl N-methyl phosphoramidothioate melting at 144.5°–146° C.

O-naphthalimido O-isobutyl N-methyl phosphoramidothioate melting at 138°–140° C.

O-naphthalimido O-methyl N,N-dibutyl phosphoramidothioate (having a molecular weight of 434.5).

The novel compounds of the present invention are useful as pesticides and internal parasiticides for the control of a number of household and agricultural pests, and are particularly useful in animal husbandry for the control of ticks, flies, Ostertagi sp., Trichostrongylus sp., *Haemonchus contortus* and Esophagostomum sp. In such operations, good controls of ticks and flies are obtained with formulations containing 0.1 percent by weight and good controls of internal parasites are obtained at dosages of from 5 to 100 milligrams per kilogram of body weight. For such uses, the products can be dispersed on an inert finely divided solid such as chalk or talc or a finely divided solid surface-active dispersing agent and the resulting products can be employed as dusts. Such mixtures can also be dispersed in water with or without the aid of a surface active agent and employed as sprays. In other procedures, the products can be employed as active constituents in solvent solutions, oil-in-water or water-in-oil emulsions, aqueous dispersions or animal feeds, concentrates or supplements. In representative operations, O-naphthalimido O-methyl N-methyl phosphoramidothioate in liquid compositions at a concentration of 0.01 percent by weight gives 100 percent kills of ticks and at dosages of 25 milligrams per kilogram of body weight gives excellent controls of internal parasites.

In a further operation, O-naphthalimido O-methyl N-methyl phosphoramidothioate is dispersed in fresh calf fecal matter containing ova of Cooperia sp., Trichostrongylus sp., *Haemonchus contortus, Ostertagia ostertagi,* Esophogostonum sp., and Bunostomum sp., to form a treated culture containing as sole active ingredient 300 parts per million by weight of the named compound. The culture is incubated for a period of time under conditions conducive to the hatching and growth of larvae and thereafter examined microscopically. No larvae are found, thus indicating a 100 percent control of the named species. In successive operations employing the same procedures and employing as sole active ingredient one of O-naphthalimido O-methyl N-isopropyl phosphoramidothioate, O-naphthalimido O-sec-butyl N-methyl phosphoramidothioate, and O-naphthalimido O-methyl N-propyl phosphoramidothioate, each of the named compounds gives a 100 percent control. In identical operations, the known triester compound O-naphthalimido O,O-diethyl phosphorothioate gives zero percent control of these named organisms.

I claim:

1. Compound of the formula

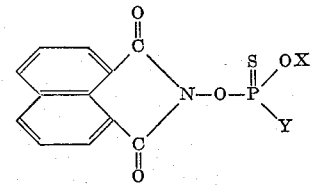

wherein X represents loweralkyl and Y represents a member selected from the group consisting of amino and loweralkylamino.

2. O-naphthalimido O-methyl N-isopropyl phosphoramidothioate.
3. O-naphthalimido O-methyl N-methyl phosphoramidothioate.
4. O-naphthalimido O-sec-butyl N-methyl phosphoramidothioate.
5. O-naphthalimido O-methyl N-propyl phosphoramidothioate.

References Cited by the Examiner

UNITED STATES PATENTS

| | | | |
|---|---|---|---|
| 2,855,425 | 10/1958 | Tolkmith et al. | 260—461 |
| 2,875,234 | 2/1959 | Kauer et al. | 260—461 |
| 2,894,019 | 7/1959 | Maeder et al. | 260—461 |
| 2,959,516 | 11/1960 | Sallmann | 260—461 |
| 2,975,207 | 3/1961 | Raths | 260—461 |
| 3,159,645 | 12/1964 | Rigterink | 260—302 |

FOREIGN PATENTS

| | | |
|---|---|---|
| 215,977 | 10/1958 | Australia. |
| 654,791 | 6/1951 | Great Britain. |

ALEX MAZEL, *Primary Examiner.*

HENRY R. JILES, NICHOLAS RIZZO, *Examiners.*

D. M. KERR, DONALD G. DAUS, *Assistant Examiners.*